United States Patent [19]

Waters

[11] Patent Number: 4,967,944
[45] Date of Patent: * Nov. 6, 1990

[54] TRUCK TOOL BOX

[75] Inventor: John E. Waters, Waco, Tex.

[73] Assignee: Advanced Plastics, Inc., Jonesboro, Ark.

[ * ] Notice: The portion of the term of this patent subsequent to Dec. 18, 2001 has been disclaimed.

[21] Appl. No.: 217,081

[22] Filed: Jul. 7, 1988

Related U.S. Application Data

[63] Continuation of Ser. No. 790,817, Oct. 24, 1985, abandoned, which is a continuation of Ser. No. 683,060, Dec. 18, 1984, abandoned, which is a continuation of Ser. No. 516,775, Jul. 25, 1983, Pat. No. 4,488,669.

[51] Int. Cl.$^5$ ...................... B65D 43/16; B60R 11/00
[52] U.S. Cl. .................. 224/273; 224/42.42; 296/37.6
[58] Field of Search ............. 296/37 R, 37.6; 220/20, 220/412, 408; 224/273, 42.42, 42.46 R; 206/518, 519

[56] References Cited

U.S. PATENT DOCUMENTS

| | | |
|---|---|---|
| D. 259,413 | 6/1981 | Rehkopf . |
| D. 285,673 | 9/1986 | Waters .................... D12/57 |
| 1,032,326 | 7/1912 | Ericksen . |
| 1,503,894 | 8/1924 | Hamilton ................ 190/35 X |
| 1,926,162 | 9/1933 | Moberly ..................... 217/7 |
| 2,612,200 | 9/1952 | June ......................... 220/20 |
| 2,629,644 | 2/1953 | Heys ............... 312/DIG. 33 X |
| 2,724,595 | 11/1955 | Amann ..................... 220/20 |
| 2,735,597 | 2/1956 | Treleven ................ 224/273 |
| 2,754,079 | 7/1956 | Krueger et al. ......... 220/334 X |
| 2,979,190 | 4/1961 | Daigle .................. 224/273 X |
| 3,229,946 | 1/1966 | Mackay ................... 224/273 |
| 3,640,423 | 2/1972 | Parker et al. ............ 296/37.6 |
| 3,642,168 | 2/1972 | Wiley, Jr. et al. .......... 206/518 |
| 3,664,704 | 5/1972 | Ellis ................ 224/42.42 X |
| 3,727,971 | 4/1973 | Sisler ............... 224/42.42 X |
| 3,759,416 | 9/1973 | Constantine ........... 220/72 X |
| 3,791,547 | 2/1974 | Branscum ............... 220/412 |
| 3,854,621 | 12/1974 | Parry . |
| 3,940,009 | 2/1976 | Szeles ................. 296/37.6 X |
| 3,987,829 | 10/1976 | Leone . |
| 4,190,281 | 2/1980 | Chandler .................. 296/37.6 |
| 4,213,539 | 7/1980 | Reuter . |
| 4,215,896 | 8/1980 | Drouin ................. 296/37.6 X |
| 4,288,011 | 9/1981 | Grossman . |
| 4,403,786 | 9/1983 | Ulics ...................... 224/273 X |
| 4,458,570 | 7/1984 | Morrison ............... 220/336 X |
| 4,488,669 | 12/1984 | Waters .............. 312/DIG. 33 X |
| 4,499,998 | 2/1985 | Carlson ..................... 220/412 |
| 4,522,326 | 6/1985 | Tuohy, III ............... 224/310 |
| 4,531,774 | 7/1985 | Whatley .............. 224/273 X |
| 4,580,827 | 4/1986 | Feagan .............. 224/42.42 X |
| 4,593,816 | 6/1986 | Langenbeck .......... 220/72 X |
| 4,623,071 | 11/1986 | Malcolm ................ 220/337 |
| 4,674,665 | 6/1987 | Van Kirk ............... 224/273 |

OTHER PUBLICATIONS

Final Consent Judgment (entered Oct. 22, 1986) in Advanced Plastics, Inc., v, Contico International, Inc. et al., No. 85-0227-C-1 (E.D. MO., St. Louis Div.).

"Judgment" and Findings of Fact and Conclusions of Law dated Feb. 10, 1984 in *Hurt v. Kosmo*, No. J-C-8-3-363 (E.D. Ark., Jonesboro Div.). Advertisement for "Nevr-Rust Tool Tainer, Patent #4,288,011" date unknown.

"Linear LDPE debugs toolbox design," Plastic Design Forum, Jul.-Aug., 1981, pp. 42–43.

"Roughrider, The Cardinal American *Paxon Utility Box" advertisement date unknown.

Mar. 28, 1986 letter of Neal Kalishman to Thomas E.

(List continued on next page.)

*Primary Examiner*—Ernest G. Cusick
*Attorney, Agent, or Firm*—Gerald G. Crutsinger; John F. Booth; Norman L. Gundel

[57] ABSTRACT

A nonmetallic container adapted for use as a tool or utility box in a pickup truck which is preferably unitarily constructed of linear high-density polyethylene and is adapted to fit both standard and compact pickup trucks.

13 Claims, 3 Drawing Sheets

OTHER PUBLICATIONS

Wack and John F. Booth, entitled Notice Pursuant to 35 USC § 282.

May 23, 1986 letter of Joseph C. Sullivan to John F. Booth and two page attachment entitled "Rule 282".

(Second) May 23, 1986 letter of Joseph C. Sullivan to John F. Booth re "Rule 282 notice", and "Kautex Windsurfer".

1979-80 attempt by LOF Plastics, Inc. and Tempo Products Company to make a blow molded plastic truck tool box.

Amended Complaint in *Advanced Plastics, Inc. v. Contico International, Inc. and Contico Automotive, Inc.*, No. 85-0227-C-1 (E.D. Mo.) date unknown.

Amended Answer in *Advanced Plastics, Inc. v. Contico International, Inc. and Contico Automotive, Inc.*, No. 85-0227-C-1 (E.D. Mo.) date unknown.

"Communication from the Examiner" dated Mar. 24, 1986 in Ser. No. 516,776.

"Decision Refusing Rejection" dated Mar. 31, 1986 in Ser. No. 516,776.

Pages 614 and 615 of Sears 1984 Spring and Summer General Catalog, Items J and K.

Seven photographs of a metal truck tool box (date unknown).

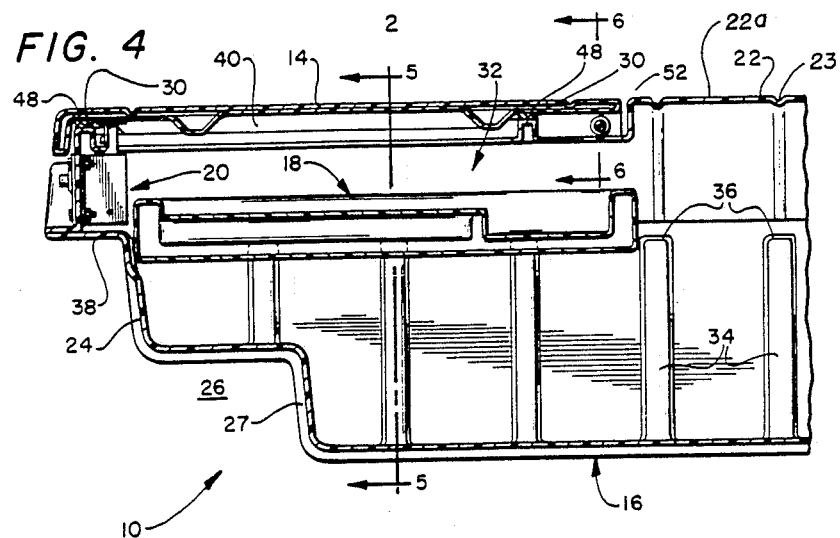
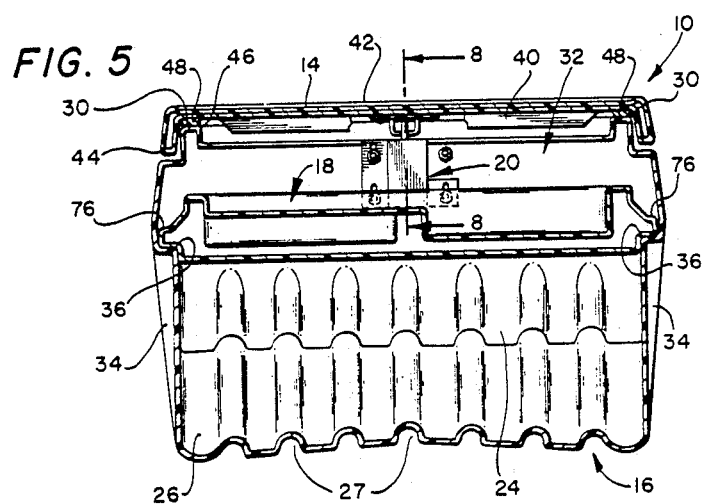

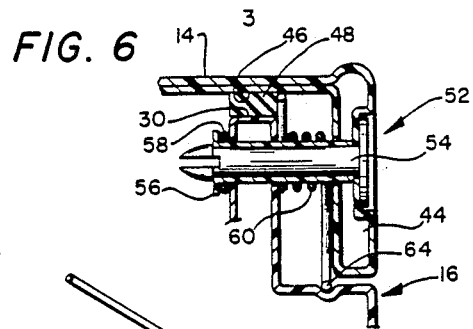
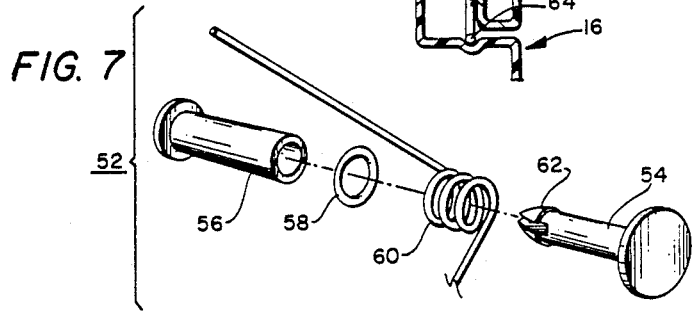
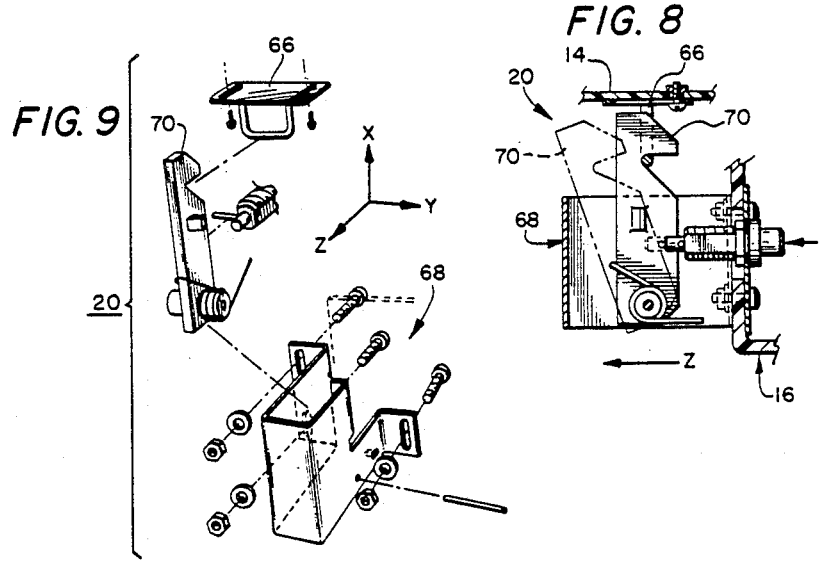

TRUCK TOOL BOX

This application is a continuation of copending utility application Ser. No. 790,817, filed Oct. 24, 1985 and now abandoned, which was itself a continuation of copending utility application Ser. No. 683,060, filed Dec. 18, 1984 and now abandoned, which was itself a continuation of then copending utility application Ser. No. 516 775, filed July 25, 1983 and issued as Waters U.S. Pat. No. 4,488,669 on Dec. 18, 1984.

TECHNICAL FIELD

The present invention relates to improvements in nonmetallic containers primarily for use as tool or utility boxes in pickup trucks. The improved tool or utility box of the present invention is unitarily constructed of nonmetallic material such as high density polyethylene and is adapted to fit both standard and compact pickup trucks. The subject tool boxes are attractive, waterproof, strong, lightweight, durable, rust-resistant, and relatively inexpensive to manufacture.

BACKGROUND ART

Pickup trucks comprise a large portion of the vehicles currently in use. One problem present in pickup trucks is that a minimum amount of enclosed space is provided for the protection and storage of tools and other valuable items. To provide for storage and transportation of items in a pickup truck, it is common to use tool or utility boxes which fit between the side panels behind the cab of the pickup truck. In the past, these boxes were commonly made from metallic materials by use of welded construction. However, the metal boxes are subject to rust and corrosion, particularly when used in coastal localities or when used for storing substances that are reactive with metals.

More recently, to avoid these corrosion problems, tool or utility boxes have been manufactured from noncorrosive thermoplastic polymers such as high-density polyethylene. Two such containers are marketed under the tradenames NEVR-RUST TOOL-TAINER and ROUGHRIDER by Nevr-Rust Tool-Tainer, Inc. and by Cardinal American, respectively.

The first container is disclosed in U.S. Pat. No. 4,288,011 and employs telescoping members with underlying support means. The telescoping members permit the width of the box to be adjusted so as to accommodate different width beds. The underlying support means are required because of the loss in strength and rigidity which is experienced through use of the telescoping members.

The second container apparently employs a one piece molded tub-like bottom to which a lid assembly having two hinged covers is subsequently mounted.

Both of the prior art containers employ covers having hinged end portions that are upwardly inclined relative to the horizontal plane extending between the tops of the pickup side panels. These inclined covers partially obstruct the vision of the pickup operator through the rear window, particularly during backing, and are therefore hazardous to use. Furthermore, both containers have covers that are reinforced by raised outside edges and longitudinal trusses. These design features are undesirable because they tend to trap water, dirt and other debris, and spoil the outward appearance of the containers. Also, because the covers are not mounted flush with the web portion of the body disposed between, the covers, the hinges are more easily knocked out of alignment or broken when other objects or materials are hauled in the same pickup bed.

SUMMARY OF THE INVENTION

A tool or utility box is provided which can be simply and easily molded from a nonmetallic material to fit various sizes and models of pickup trucks. The tool boxes of the invention are characterized by their strong unitary construction and their low profile. This low profile is achieved by recessing the lids in such manner that the top of the lids and the web portion of the container extending between the lids form a flat and substantially continuous upper surface when the lids are in the closed position.

According to a preferred embodiment of the invention, a tool box for use with pickup trucks is provided that comprises hinged covers having recessed hinges with dual lid springs for controlled lid opening. According to yet another embodiment of the invention, a tool box for use with pickup trucks is provided that comprises a unitary, molded thermoplastic container having bottom and end portions that further comprise a plurality of spaced apart longitudinal ribs.

According to yet another embodiment of the invention, a molded thermoplastic pickup tool box is provided which comprises recessed lower end portions adapted to accommodate the wheel wells of a compact pickup.

According to yet another embodiment of the invention, a nonmetallic container having pivotally hinged lids on both ends thereof and an adjustable lock assembly adapted to separately engage each lid in its closed position is provided. According to yet another embodiment of the invention, a pickup tool box is provided that comprises hinged lid portions having a double wall construction wherein a portion of the inner wall is bonded to the outer wall and a portion of the inner wall is spaced apart from the outer wall of the lid portions.

Other objects and improvements of the invention will be explained in more detail below.

BRIEF DESCRIPTION OF THE DRAWINGS

For a full understanding of the preferred embodiment of the present invention, reference may be had to the following detailed description taken in conjunction with the accompanying drawings in which:

FIG. 4 is a sectional elevation view taken along line 4—4 of FIG. 2 looking in the direction of the arrows;

FIG. 5 is a sectional elevation view taken on line 5—5 of FIG. 4 looking in the direction of the arrows;

FIG. 6 is a sectional detail view of one hinge assembly as installed in the tool box of the present invention so as to pivotally connect one side of a lid to the body of the box;

FIG. 7 is an exploded view of the hinge assembly shown in FIG. 6;

FIG. 8 is a sectional view taken on line 8—8 of FIG. 5 looking in the direction of the arrow showing the lock structure; and FIG. 9 is an exploded view of the lock assembly of a container of the present invention.

Like numerals are used to designate like parts in all figures of the drawings.

DETAILED DESCRIPTION

Figure 1:
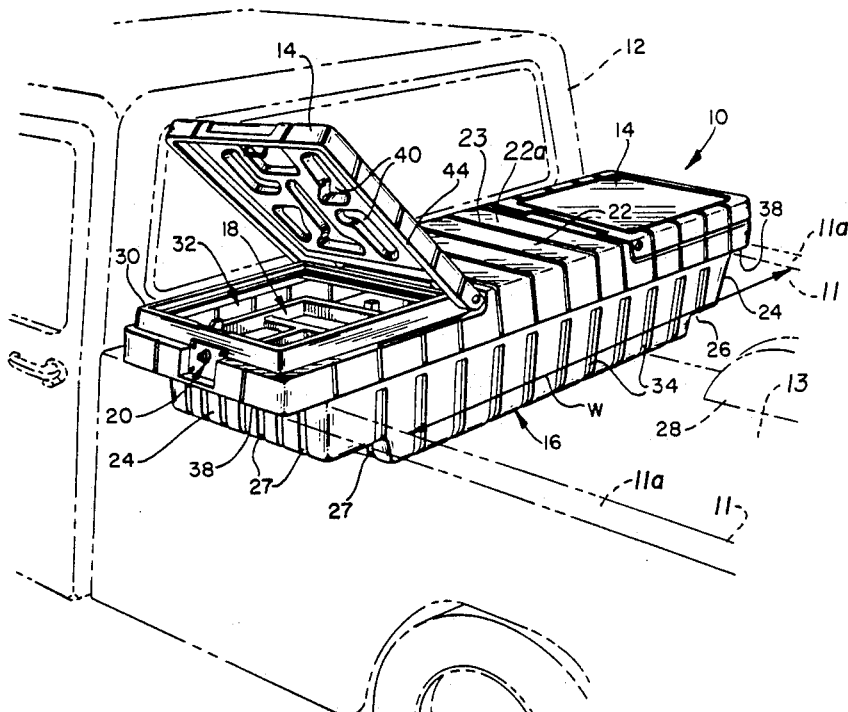
FIG. 1 is a perspective view of the pickup truck tool box of the present invention showing the box installed in a bed of a pickup truck shown in phantom lines.
Figure 2:
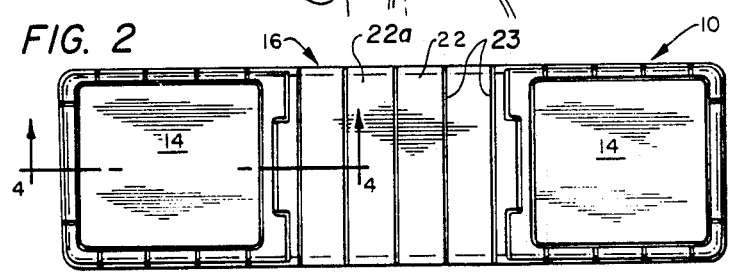
FIG. 2 is a plan view of a preferred embodiment of the container of the present invention.
Figure 3:
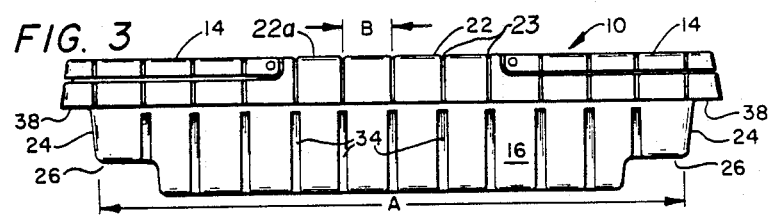
FIG. 3 is an elevation view of the container of the present invention.

Referring now to the drawings, FIG. 1 depicts a tool or utility box assembly which for purposes of description is identified as reference numeral 10. In FIG. 1, the box 10 is shown installed above the bed 13 of a pickup truck 12 which is shown in phantom lines. The interior width of the bed 13 of the pickup truck 12 between the side panels 11 thereof is shown as W. Box 10 rests on the upper surfaces 11a of the side panels 11 of the pickup truck 12 and bridges the distance W therebetween. Box 10 is anchored in position by suitable means such as screws and is utilized to supplement the space available within the pickup truck for carrying tools and the like. The box 10 shown in FIG. 1 has a pair of self-sealing lids 14 which are pivotally connected to body 16 of box 10 to provide access into the interior of the box. As will be described hereinafter in detail, box 10 is preferably provided with tray assembly 18 slidably disposed within body 16 and with latch assembly 20 for selectively locking the lids 14 in a closed position.

Referring to FIGS. 1-5, body 16 of box 10 is unitarily formed from a nonmetallic material. A preferred nonmetallic material for use in forming body 16 of box 10 is polyethylene, and more particularly, linear high-density polyethylene. Linear high-density polyethylene is a thermoplastic material having a molecular weight of about 6,000 or more. Linear high-density polyethylene is an excellent barrier to water vapor and moisture, has a tensile strength of about 4,000 psi, an impact strength of about 8 foot-pounds per inch of notch, and good electrical resistivity. Although linear high-density polyethylene is a preferred polymer for use in the tool box of the invention, it should be understood that other polymers, copolymers, terpolymers, polymeric laminates and the like can also be used within the scope of the invention.

Body 16 preferably further comprises a central portion 22 joining two integrally formed spaced end portions 24. Each end portion 24 has a wheel well clearance relief 26 to prevent interference with the wheel well 28 of the pickup truck 12. This feature is particularly desirable where box 10 is intended for use in a compact pickup having a relatively short wheelbase and bed length. Each end portion 24 has an endless upwardly facing seal surface 30 extending around the periphery of an opening 32. As will be described in more detail hereinafter, this seal surface 30 cooperates with a seal 48 carried in lid 14 to seal the opening 32 when the lid is in a closed position.

The end portions 24 and central portion 22 are provided with a plurality of spaced ribs 27, 34 which are integrally formed in the bottom and sides of body 16. As seen in FIGS. 1, 4 and 5, spaced ribs 27 extend longitudinally along the bottom and end portions of body 16. As seen in FIGS. 1, 3, 4 and 5, ribs 34 are spaced along the length of body 16, and extend in a direction that is substantially vertical when box 10 is installed in the pickup truck as shown in FIG. 1. Ribs 27, 34 add structural integrity and rigidity to the container. Each rib 34 also has an upper surface which forms an inwardly extending shoulder on the interior of the body 16. The shoulders 36 of each of the ribs 34 are aligned and cooperate together to act as a guide or support surface for the tray 18 as can be seen in FIGS. 4 and 5. Ribs 23 in central portion 22 extend transversely across box 10 at spaced intervals which generally correspond to the spacing of ribs 34.

According to a particular feature of the present invention, body 16 is designed with a downwardly facing flange or shoulder 38 which rests on the upper surface 11a of the side panels 11 of the pickup truck 12. On the inward side of shoulder 38 body 16 has a portion which extends down toward the pickup truck bed as shown in FIG. 1. This portion has a maximum length, shown in FIG. 3 as dimension A, which should preferably not exceed the width of the pickup bed 13 between the side panels 11 with which box 10 is intended to be used. According to a particular feature of the present invention, the dimension A of box 10 can be simply and easily varied to produce tool boxes adapted to fit pickup trucks of various widths W without requiring a separate mold for each different width. This can be accomplished by selecting the dimension B which is the center line distance between the ribs 23 to be such that by adding or removing sections of length B from the mold, the resultant lengths will fit pickup trucks currently on the market. Thus, the ribs 23, 27, 34 serve a combined three-fold function of improving rigidity and crush resistance of the containers, providing an upper surface or shoulder 36 on which to support tray 18, and breaking the continuity of the surface of the central portion 22 so that inserts or sections can be added to or subtracted from the mold without detracting from the surface appearance of the box itself.

According to a preferred embodiment of the present invention, lids 14 of box 10 are likewise formed from a nonmetallic material such as high-density polyethylene and are each unitarily molded. Accordingly, as can be seen in FIG. 4, each lid 14 is a doubled wall structure having a plurality of indentations 40 in the underside thereof in which the upper and lower walls of the lid 14 are fused together for structural integrity. Each lid 14 has a central portion 42 which is bounded on three sides by flange 44. A sealing surface 46 carries a flexible seal 48 thereon and is positioned to extend around the interior surface of the lid 14. Seal 48 can be constructed from a flexible rubber material or the like and is positioned to correspond and mate with the sealing surface 30 of body 16 when the lid is in the closed position shown in FIGS. 4 and 5. This seal 48 aids in preventing moisture from entering box 10 and thereby reduces the likelihood that articles stored inside the box will rust, corrode, or be otherwise damaged by the moisture. Lids 14 are preferably mounted flush with the upper surface 22a of central portion 22 to provide a low profile for the container.

Dual hinge assemblies 52 pivotally connect each lid 14 to body 16. Each hinge assembly 52 is positioned outside of the continuous sealing surface 30. The details of hinge assembly 52 are described in relation to FIGS. 6 and 7. Each hinge assembly 52 comprises a shaft 54 which telescopes into and snaps in position in a sleeve 56. As can be seen in detail in FIG. 6, sleeve 56 is first inserted through two aligned openings in a flange formed on body 16 and then through two aligned openings in flange 44 on lid 14. Sleeve 56 has a shoulder which is utilized to capture and compress an O-ring 58 against the interior surface of the flange on body 16 as shown in FIG. 6. A spring assembly 60 is disposed between lid 14 and body 16 and slidably engages the outside surface of sleeve 56. Shaft 54 has a bifurcated locking end 62 which holds the shaft in position and locks it to sleeve 56 when shaft 54 is forced into sleeve 56 as shown in FIGS. 6 and 7. One end of spring assembly 60 rests in a groove 64 formed in the upper surface of body 16 and the other end contacts the lid to resiliently urge the lid to the open position. Thus, when latch assembly 20 is released, lid 14 will remain in the open position by reason of the resilient force of spring 60.

Latch assembly 20 is described in further detail in relation to FIGS. 8 and 9. According to a particular feature of the present invention, latch assembly 20 is adjustable in two separate directions identified by coordinants X and Z in FIG. 9. As can be seen in FIG. 8, latch assembly 20 comprises a metallic U-shaped catch 66 having a slotted base portion that is adjustably mounted on the inside surface of lid 14 at the end opposite hinge assemblies 52 by use of fasteners such as screws, or the like. The slots allow catch 66 to be variably positioned in the direction of arrow Z for proper alignment with locking mechanism 68 of latch assembly 20. Locking mechanism 68 is mounted on the front end wall of body 16 and is provided with suitable slots for adjustment in the direction of arrow X. Locking mechanism 68 is of a type which is commercially available and can be provided with a spring loaded ratchet 70 which engages the catch 66 to hold lid 14 in a closed position. Locking mechanisms of this type are presently available or well known to those of ordinary skill in the art.

Tray 18 can likewise be molded from a polymeric material and is preferably provided with a flange 76 extending along each side thereof. Flanges 76 are shaped so that when the tray is in the position shown in FIG. 5, flanges 76 will rest on shoulders 36 and can slidably engage the upper surface of shoulders 36 from end to end within tool box 10.

It will be understood, of course, that the disclosure herein relates only to the preferred embodiment of the present invention, and that numerous alterations, changes and modifications can be made in the apparatus disclosed herein without departing from the spirit and scope of the invention as claimed below.

What is claimed is:

1. A container adapted for use as a tool or utility box in a pickup truck, said container comprising:
   a unitarily molded polymeric body including apertures therethrough and further including unitarily and integrally molded side walls, end walls, bottom wall, and top wall with an upwardly disposed opening in said top wall, wherein said body is adapted to receive support from side panels of a pickup truck without receiving support from the bed floor of said pickup truck;
   a hinge pin; and
   a lid including two walls and having apertures through said two walls, said lid being disposed over said upwardly disposed opening and pivotally attached to said body by said hinge pin passing through said apertures in said body and in said two walls of said lid, said apertures in said body and said two walls of said lid being aligned, wherein said apertures both in said body and in said two walls of said lid are holes through surfaces of said body and through said two walls of said lid, which holes are completely surrounded by said molded polymeric body and by said two walls of said lid, respectively.

2. The container of claim 1 wherein said body further includes a second upwardly disposed opening in said top wall and at least a portion of said top wall extends between the side walls intermediate said upwardly disposed openings.

3. The container of claim 1 wherein said body also includes a lip adjacent opposing edges of said upwardly disposed opening, said lip having two walls, and wherein said apertures of said body pass through said two walls of said lip and wherein said hinge pin passes through said apertures in said body by passing through said apertures in said two walls of said lip.

4. A container adapted for use as a tool or utility box in a pickup truck, said container comprising:
   a molded polymeric body including apertures therethrough and further including an opening in the surface thereof;
   a hinge pin; and
   a molded polymeric lid including two walls and having apertures through said two walls, said lid being disposed over said opening and pivotally attached to said body by said hinge pin directly engaging said apertures in both said body and said lid, said apertures in said body and in said two walls of said lid being aligned, wherein said apertures in said body are holes through surfaces of said body and wherein said apertures in said lid are holes through surfaces of said two walls of said lid, which holes in said body and in said two walls of said lid are completely surrounded by said molded polymeric body and by said two walls of said molded polymeric lid, respectively.

5. The container of claim 4 wherein said body also includes a lip adjacent opposing edges of said opening. said lip having two walls, and wherein said apertures of said body pass through said two walls of said lip and wherein said hinge pin passes through said apertures in said body by passing through said apertures in said two walls of said lip.

6. A container adapted for use as a crossbed tool or utility box in a pickup truck, said container comprising
   a molded polymeric body including unitarily molded bottom, side and end wall portions and further including a top wall portion and having an upwardly directed opening at each end of the body and further including a lip adjacent opposing sides of said upwardly directed openings, said lip having two walls, and said two walls of said lip having apertures therethrough, said apertures being aligned, with said top wall portion connecting the side wall portions between the upwardly directed openings, said body adapted for connection to side panels of a pickup truck without receiving support from the bed floor of the pickup truck;
   a lid disposed over each of said upwardly disposed openings, each of said lids including a horizontal surface partially surrounded by a downwardly depending flange along opposed edges of said lid, said downwardly depending flange having two walls and having apertures through said two walls, said apertures of said two walls of said downwardly depending flange being aligned; and
   a hinge pin passing through said apertures in said two walls of said downwardly depending flange and in said two walls of said lip, said apertures in said flange and said lip being aligned, to pivotally connect each lid to the body, wherein said hinge pin is substantially perpendicular to portions of said flange and of said lip having said apertures.

7. A container adapted for use as a crossbed tool or utility box in a pickup truck, said container comprising
a unitarily molded polymeric body including apertures therethrough and further including unitarily molded bottom, side, end and top wall portions and further including an upwardly directed opening at each end of the body, with said top wall portion connecting the side wall portions between the upwardly directed openings, said body adapted to receive support from side panels of a pickup truck without receiving support from the bed of the pickup truck, and with said side wall portions including vertically disposed ribs which terminate in upwardly disposed shoulders on an inner surface of said body with said shoulders being aligned to provide a discontinuous support surface for an internal tray within said body;
a lid disposed over each of said upwardly disposed openings, each of said lids including a horizontal surface partially surrounded by a downwardly depending flange along opposed edges of said lid, said flange having two walls, said two walls of said flange having apertures therethrough, said apertures of said two walls of said downwardly depending flange being aligned; and
a hinge pin passing through said apertures in said two walls of said downwardly depending flange and in said body adjacent said downwardly depending flange to pivotally connect each lid to the body.

8. The container of claim 7 wherein said body also includes a lip adjacent opposing edges of said upwardly disposed openings, said lip having two walls, and wherein said apertures of said body pass through said two walls of said lip and wherein said hinge pin passes through said apertures in said body by passing through said apertures in said two walls of said lip.

9. A container adapted for use as a crossbed tool or utility box in a pickup truck, said container comprising
a polymeric body including apertures therethrough and further including unitarily molded bottom, side and end wall portions and further including a top wall portion and having an upwardly directed opening at each end of the body, with said top wall portion connecting the side wall portions between the upwardly disposed openings, said body adapted for connection to side panels of a pickup truck, and with said side wall portions including vertically disposed ribs which terminate in upwardly disposed shoulders on an inner surface of said body, with said shoulders being aligned to provide a discontinuous support surface for an internal tray within said body;
a lid disposed over each of said openings, each of said lids including a horizontal surface partially surrounded by a downwardly depending flange along opposed edges of said lid, said flange having two walls, said two walls of said flange having apertures therethrough, said apertures of said two walls of said downwardly depending flange being aligned; and
a hinge pin passing through said apertures in said two walls of said downwardly depending flange and in said body adjacent said downwardly depending flange to pivotally connect each lid to the body.

10. The container of claim 9 wherein said body also includes a lip adjacent opposing edges of said upwardly disposed openings, said lip having two walls, and wherein said apertures of said body pass through said two walls of said lip and wherein said hinge pin passes through said apertures in said body by passing through said apertures in said two walls of said lip.

11. A container adapted for use as a tool or utility box in a pickup truck, said container comprising:
a molded polymeric body including an opening in the surface thereof and including a lip adjacent opposing edges of the opening, said lip having two walls, and said two walls of said lip having apertures therethrough, said apertures being aligned;
a hinge pin; and
a molded polymeric lid having an aperture therethrough and being disposed over said opening and pivotally attached to said body by said hinge pin directly engaging said apertures in said lid and in said two walls of said lip, wherein said aperture in said lid is a hole passing through the surface of said lid and wherein said apertures in said two walls of said lip are holes passing through surfaces of said two walls of said lip, which holes in said lid and in said two walls of said lip are aligned and are completely surrounded by said molded polymeric lid and by said two walls of said molded polymeric lip, respectively.

12. A container adapted for use as a crossbed tool or utility box in a pickup truck, said container comprising
a unitarily molded polymeric body including unitarily molded bottom, side, end and top wall portions and further including an upwardly directed opening at each end of the body and further including a lip adjacent opposing sides of said openings, said lip having two walls, and said two walls of said lip having apertures therethrough, said apertures being aligned, with said top wall portion connecting the side wall portions between the upwardly directed openings, said body adapted to receive support from side panels of a pickup truck without receiving support from the bed of the pickup truck, and with said side wall portions including vertically disposed ribs which terminate in upwardly disposed shoulders on an inner surface of said body with said shoulders being aligned to provide a discontinuous support surface for an internal tray within said body;
a lid disposed over each of said upwardly directed openings, each of said lids including a horizontal surface partially surrounded by a downwardly depending flange along opposed edges of said lid with apertures through said flange; and
a hinge pin passing through said apertures in said downwardly depending flange and in said two walls of said lip of said body to pivotally connect each lid to the body.

13. A container adapted for use as a crossbed tool or utility box in a pickup truck, said container comprising
a polymeric body including unitarily molded bottom, side and end wall portions and further including a top wall portion and having an upwardly directed opening at each end of the body and further including a lip adjacent opposing sides of said openings, said lip having two walls, and said two walls of said lip having apertures therethrough, said apertures being aligned, with said top wall portion connecting the side wall portions between the upwardly disposed openings, said body adapted for connection to side panels of a pickup truck, and with said side wall portions including vertically disposed ribs which terminate in upwardly disposed shoulders on an inner surface of said body, with said shoulders being aligned to provide a discontinuous support surface for an internal tray within said body;

a lid disposed over each of said upwardly directed openings, each of said lids including a horizontal surface partially surrounded by a downwardly depending flange along opposed edges of said lid with apertures through said flanges; and a hinge pin passing through said apertures in said downwardly depending flange and in said two walls of said lip of said body to pivotally connect each lid to the body.

* * * * *